(12) United States Patent
Osawa et al.

(10) Patent No.: US 8,944,732 B2
(45) Date of Patent: Feb. 3, 2015

(54) MACHINING HEAD REPLACEABLE ROTATING TOOL, HOLDER, AND MACHINING HEAD

(75) Inventors: Jiro Osawa, Toyokawa (JP); Tasuku Itoh, Toyokawa (JP)

(73) Assignee: OSG Corporation, Toyokawa (JP)

( * ) Notice: Subject to any disclaimer, the term of this patent is extended or adjusted under 35 U.S.C. 154(b) by 368 days.

(21) Appl. No.: 13/376,526

(22) PCT Filed: Jul. 9, 2009

(86) PCT No.: PCT/JP2009/062556
§ 371 (c)(1),
(2), (4) Date: Dec. 27, 2011

(87) PCT Pub. No.: WO2010/143315
PCT Pub. Date: Dec. 16, 2010

(65) Prior Publication Data
US 2012/0093602 A1    Apr. 19, 2012

(30) Foreign Application Priority Data

Jun. 11, 2009   (JP) ................................ 2009-140545

(51) Int. Cl.
| B23B 31/11 | (2006.01) |
| B23C 5/10 | (2006.01) |
| B23B 31/00 | (2006.01) |

(52) U.S. Cl.
CPC .............. *B23C 5/10* (2013.01); *B23B 31/005* (2013.01); *B23B 31/1122* (2013.01);
(Continued)

(58) Field of Classification Search
CPC .... B23B 27/16; B23B 31/11; B23B 31/1115; B23B 31/1122; B23B 2231/0204; B23B 2231/0208; B23B 2251/02; B23B 2270/09; B23B 2270/12; B23C 2210/02; B23C 2240/32
USPC ....... 279/8; 409/234; 408/238, 239 R, 239 A, 408/226

IPC ....................................................... B23B 31/11
See application file for complete search history.

(56) References Cited

U.S. PATENT DOCUMENTS 2,207,005 A * 7/1940 Haas .............................. 403/334
4,828,294 A * 5/1989 Bounie et al. ................. 285/334
(Continued)

FOREIGN PATENT DOCUMENTS

| CN | 101027155 A | 8/2007 |
| CN | 101058122 A | 10/2007 |

(Continued)

OTHER PUBLICATIONS

International Search Report in International Application No. PCT/JP2009/062556; dated Sep. 29, 2009 (with English-language translation).
(Continued)

*Primary Examiner* — Andrea Wellington
*Assistant Examiner* — Alan Snyder
(74) *Attorney, Agent, or Firm* — Oliff PLC

(57) ABSTRACT

A machining head replaceable rotating tool having a fastening male screw and a fastening female screw disposed on respective shaft centers of one and the other of a machining head and a holder, the fastening male and female screws being threadably engaged with each other to concentrically and removably attach the machining head to a tip portion of the holder, the machining head and the holder being disposed with abutting surfaces abutted against each other in a fastened state when the fastening male and female screws are threadably engaged, the machining head replaceable rotating tool being integrally and rotationally driven via the holder in a tool rotation direction causing the fastening male and female screws to be fastened by a machining load to perform predetermined machining with the machining head, the abutment of the abutting surfaces preventing the fastening male and female screws from being further fastened by a machining load, the fastening male and female screws being saw-tooth buttress screws having a following flank angle α smaller than a leading flank angle β.

6 Claims, 6 Drawing Sheets

(52) U.S. Cl.
CPC   *B23B 2231/0204* (2013.01); *B23B 2260/1388* (2013.01); *B23C 2210/02* (2013.01); *B23C 2210/03* (2013.01)
USPC ........................ 409/234; 408/226; 408/239 R

(56) References Cited

U.S. PATENT DOCUMENTS

| | | | |
|---|---|---|---|
| 5,496,137 | A | 3/1996 | Ochayon et al. |
| 5,643,211 | A | 7/1997 | Sadowski et al. |
| 5,697,917 | A | 12/1997 | Sadowski et al. |
| 5,722,953 | A | 3/1998 | Schiff et al. |
| 5,800,388 | A | 9/1998 | Schiff et al. |
| 5,875,976 | A | 3/1999 | Nelson et al. |
| 5,921,967 | A | 7/1999 | Sadowski et al. |
| 6,030,004 | A * | 2/2000 | Schock et al. ................. 285/333 |
| 7,713,004 | B2 * | 5/2010 | Lehto et al. ...................... 407/33 |
| 2004/0066040 | A1 | 4/2004 | Bennett et al. |
| 2004/0140671 | A1 | 7/2004 | Williams et al. |
| 2004/0212192 | A1 | 10/2004 | Williams |
| 2006/0049632 | A1 | 3/2006 | Williams |
| 2006/0072977 | A1 | 4/2006 | Jonsson et al. |
| 2007/0007766 | A1 | 1/2007 | Bennett et al. |
| 2007/0248421 | A1 | 10/2007 | Kakai et al. |
| 2008/0048441 | A1 | 2/2008 | Bennett et al. |
| 2008/0061549 | A1 | 3/2008 | Bennett et al. |
| 2008/0246278 | A1 | 10/2008 | Williams |
| 2009/0033093 | A1 | 2/2009 | Williams |
| 2010/0014928 | A1 | 1/2010 | Kakai et al. |
| 2010/0247263 | A1 * | 9/2010 | Azegami et al. .............. 409/234 |
| 2011/0006521 | A1 | 1/2011 | Williams |

FOREIGN PATENT DOCUMENTS

| | | |
|---|---|---|
| JP | U-06-015914 | 3/1994 |
| JP | A-07-164234 | 6/1995 |
| JP | A-2001-056075 | 2/2001 |
| JP | A-2001-170811 | 6/2001 |
| JP | A-2001-507963 | 6/2001 |
| JP | A-2003-251540 | 9/2003 |
| JP | A-2003-532844 | 11/2003 |
| JP | A-2007-502940 | 2/2007 |
| JP | A-2007-290120 | 11/2007 |

OTHER PUBLICATIONS

Chinese Office Action issued in Chinese Patent Application No. 200980160421.8 dated Feb. 26, 2013 (w/ partial translation).
Japanese Office Action issued in Japanese Patent Application No. 2009-140545 dated Mar. 12, 2013 (w/ partial translation).
Oct. 8, 2013 Chinese Office Action issued in Chinese Application No. 200980160421.8 (with translation).

* cited by examiner

FIG.1(a)
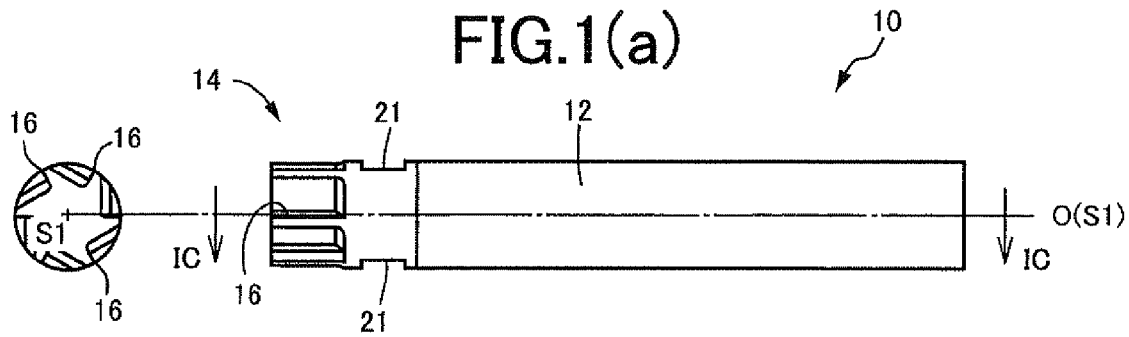
FIG.1(b)
FIG.1(c)
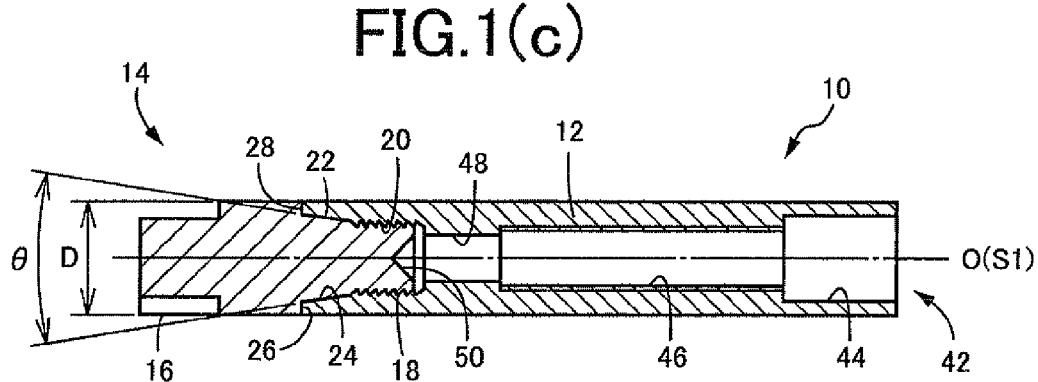
FIG.1(d)
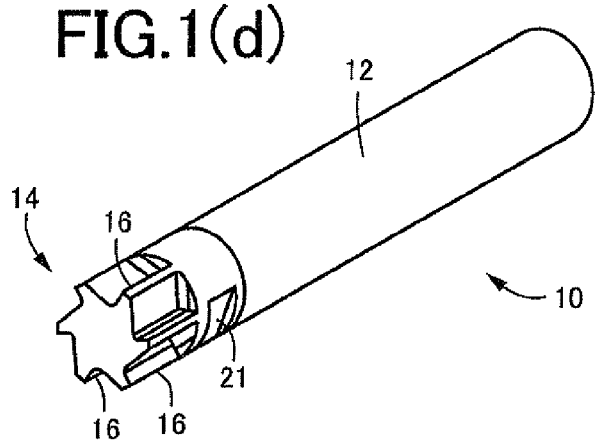

FIG.6(a)
CUTTING TEST CONDITIONS

| PROCESSING MACHINE | VERTICAL |
|---|---|
| TOOL | SQUARE END MILL |
| TOOL DIAMETER (mm) | φ12 |
| TOOL OVERHANG (mm) | 40 |
| NUMBER OF TOOL CUTTING EDGES (CUTTING EDGES) | 4 |
| CUTTING SPEED (m/min) | 100 |
| NUMBER OF ROTATIONS (min−1) | 2653 |
| FEED PER CUTTING EDGE (mm/t) | 0.1 |
| TABLE FEED (mm/min) | 1061 |
| CUTTING DEPTH (mm) | 6 |
| CUTTING WIDTH (mm) | 12 (GROOVE CUTTING) |
| CUTTING FLUID | AIR BLOW |
| WORK MATERIAL | SCM440 |

FIG.6(b)
TEST RESULT

| TEST SAMPLE | α(°) | β(°) | JUDGMENT | REMARKS |
|---|---|---|---|---|
| No1 | 30 | 30 | × | MACHINING IS OK. UNABLE TO REMOVE AFTER MACHINING. |
| No2 | 15 | 30 | × | BROKEN DURING MACHINING (2m) |
| No3 | 7 | 30 | × | BROKEN DURING MACHINING (EARLY PHASE) |
| No4 | 4 | 30 | × | BROKEN DURING MACHINING (EARLY PHASE) |
| No5 | 30 | 45 | × | MACHINING IS OK. UNABLE TO REMOVE AFTER MACHINING. |
| No6 | 20 | 45 | △ | MACHINING IS OK. DIFFICULT TO REMOVE AFTER MACHINING. |
| No7 | 15 | 55 | ○ | MACHINING IS OK. EASY TO REMOVE AFTER MACHINING |
| No8 | 7 | 45 | ○ | MACHINING IS OK. EASY TO REMOVE AFTER MACHINING |
| No9 | 4 | 40 | ○ | MACHINING IS OK. EASY TO REMOVE AFTER MACHINING |
| No10 | 3 | 45 | △ | CHATTER EXISTS DURING MACHINING EASY TO REMOVE AFTER MACHINING |

US 8,944,732 B2

MACHINING HEAD REPLACEABLE ROTATING TOOL, HOLDER, AND MACHINING HEAD

TECHNICAL FIELD

The present invention relates to a machining head replaceable rotating tool and particularly to a technique of enabling easy removal and replacement of a machining head in a machining head replaceable rotating tool having a holder and the machining head integrally coupled to each other by a fastening male screw and a fastening female screw.

BACKGROUND ART

A machining head replaceable rotating tool is known wherein (a) a fastening male screw and a fastening female screw disposed on respective shaft centers of one and the other of a machining head and a holder are threadably engaged with each other to concentrically and removably attach the machining head to a tip portion of the holder; (b) the machining head and the holder are disposed with abutting surfaces abutted against each other in a fastened state when the fastening male screw and the fastening female screw are threadably engaged; and (e) the machining head replaceable rotating tool is integrally and rotationally driven via the holder in a tool rotation direction causing the fastening male screw and the fastening female screw to be fastened by a machining load to perform predetermined machining with the machining head while the abutment of the abutting surfaces prevents the fastening male screw and the fastening female screw from being further fastened by a machining load (see Patent Document 1). With such a machining head replaceable rotating tool, since a holder can be utilized many times by replacing only a machining head made of expensive material such as cemented carbide, for example, and a plurality of types of machining can be performed with a common holder by preparing a plurality of types of machining heads, a waste of resources can be suppressed and a tool cost is reduced in either case.

PRIOR ART DOCUMENT

Patent Documents

Patent Document 1: Japanese Unexamined Patent Application Publication No. 2003-532844
Patent Document 2: Japanese Laid-Open Patent Publication No. 2001-170811

SUMMARY OF THE INVENTION

Problem to be Solved by the Invention

However, even in a machining head replaceable rotating tool with abutting surfaces preventing a fastening male screw and a fastening female screw from being further fastened, if machining is performed under conditions relatively easily generating heat such as air blow, a machining head may become unable to be removed from a holder due to adhesion. Since a triangular thread or a trapezoidal thread is generally used for the fastening male screw and the fastening female screw, if the screws are thermally-expanded while predetermined machining is performed with the machining head, it is thought that the thread of the male screw increases in a radial dimension and bites into the groove of the female screw, causing flanks on the both sides of the thread to firmly and closely contact with and adhere to flanks of the female screw. The machining with air blow makes post-processing easier as compared to cooling oil and is expected as an environment-friendly technique. In the case of a square thread having substantially perpendicular flanks on the both sides, although the flanks are unlikely to adhere regardless of heat expansion, it is problematically difficult to acquire sufficient attachment strength.

On the other hand, Patent Document 2 describes a technique of pushing out a machining head by threadably engaging a removable aiding pin from the side opposite to the machining head in the case of taper fitting of the machining head with a holder and, although it is contemplated that such a removable aiding pin is utilized with a machining head replaceable rotating tool using screw coupling, a machining head may become unable to be removed even in such a case.

The present invention was conceived in view of the situations and it is therefore an object of the present invention to enable easy removal and replacement of a machining head while maintaining predetermined attachment strength in a machining head replaceable rotating tool having a holder and the machining head integrally coupled to each other by a fastening male screw and a fastening female screw.

Means for Solving the Problems

To achieve the object, the first aspect of the invention provides a machining head replaceable rotating tool (a) having a fastening male screw and a fastening female screw disposed on respective shaft centers of one and the other of a machining head and a holder, the fastening male screw and the fastening female screw being threadably engaged with each other to concentrically and removably attach the machining head to a tip portion of the holder, (b) the machining head and the holder being disposed with abutting surfaces abutted against each other in a fastened state when the fastening male screw and the fastening female screw are threadably engaged, (c) the machining head replaceable rotating tool being integrally and rotationally driven via the holder in a tool rotation direction causing the fastening male screw and the fastening female screw to be fastened by a machining load to perform predetermined machining with the machining head, the abutment of the abutting surfaces preventing the fastening male screw and the fastening female screw from being further fastened by a machining load, wherein (d) the fastening male screw and the fastening female screw are made up of saw-tooth buttress screws (buttress thread) having a flank angle α of a following flank smaller than a flank angle β of a leading flank.

The second aspect of the invention provides the machining head replaceable rotating tool recited in the first aspect of the invention, wherein the flank angle α of the following flank is within a range of 4° to 15° and the flank angle β of the leading flank is within a range of 35° to 60°.

The third aspect of the invention provides the machining head replaceable rotating tool recited in the first or second aspect of the invention, wherein (a) the holder is disposed with a through-hole penetrating a shaft center, wherein at least a portion of the through-hole disposed with a removal female screw, wherein (b) the machining head replaceable rotating tool has a removal aiding pin inserted into the through-hole from the back end of the holder and threadably engaged with the removal female screw with a tip portion abutted against the machining head to press and push out the machining head when the threadable engagement between the fastening male screw and the fastening female screw is loosened to remove the machining head from the holder, and wherein (c) an engagement projection and an engagement recess in a conical shape fitted in surface contact with each other are respectively disposed on shaft centers at abutting locations of the removal aiding pin and the machining head.

The fourth aspect of the invention recites a holder of the machining head replaceable rotating tool of any one of the first to third aspects of the invention, and the fifth aspect of the invention recites a machining head of the machining head replaceable rotating tool of any one of the first to third invention.

The Effects of the Invention

In the machining head replaceable rotating tool, since the fastening male screw and the fastening female screw are made up of saw-tooth buttress screws having the flank angle α of the following flank smaller than the flank angle β of the leading flank, if the thermal expansion occurs when predetermined machining is performed by the machining head, the following flanks are unlikely to firmly and closely contact with and adhere to each other and the adherence of the leading flanks on the opposite side is also suppressed, thereby facilitating a removal operation when the machining head is replaced. Further, since the flank angle β of the leading flank is large, predetermined attachment strength can be maintained.

Since the flank angle α of the following flank is within a range of 4° to 15° and the flank angle β of the leading flank is within a range of 35° to 60° in the second aspect of the invention, the machining head can easily be removed and replaced while maintaining predetermined attachment strength.

In the third aspect of the invention, when the threadable engagement between the fastening male screw and the fastening female screw is loosened to remove the machining head from the holder, the removal aiding pin which is threadably engaged with the removal female screw can be abutted against the machining head to push out the machining head, thereby further facilitating the removal of the machining head. Particularly, since the abutting locations of the removal aiding pin and the machining head are disposed with the engagement projection and the engagement recess in a conical shape fitted and brought into surface contact with each other concentrically with the shaft centers, respectively, the machining head and the removal aiding pin as well as the holder are concentrically centered by the engagement of the engagement projection and the engagement recess, allowing the threadable engagement between the fastening male screw and the fastening female screw to be loosened more easily.

BRIEF DESCRIPTION OF THE DRAWINGS

FIG. 1 is a diagram of a machining head replaceable rotating tool according to one embodiment of the present invention; (a) is a front view in the direction perpendicular to a shaft center O and S1; (b) is a bottom view from the machining head side; (c) is a cross section taken along IC-IC of (a); and (d) is a perspective view.

FIG. 6 is a diagram for explaining a result when a plurality of test samples of the fastening male screw and the fastening female screw having different flank angles α, β are prepared to check the acceptance/rejection of the machining and the removability of the machining head after the machining; (a) is a diagram of cutting test conditions; and (b) is a diagram of a test result.

MODES FOR CARRYING OUT THE INVENTION

Figure 2A:
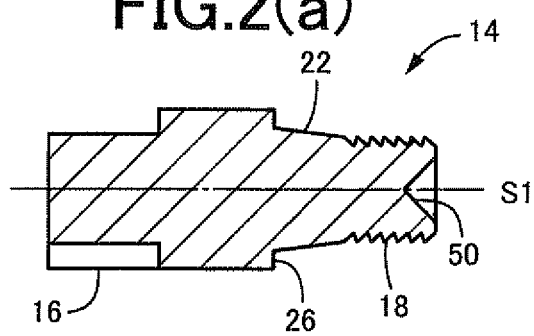
FIG. 2 is a diagram for explaining the machining head in the embodiment of FIG. 1; (a) is a cross-sectional view including a shaft center S1; (b) is a perspective view; and (c) is an enlarged view of a cross section of a fastening male screw disposed on the machining head.

A machining head replaceable rotating tool of the present invention is preferably applied to, for example, cutting tools such as an end mill, a drill, a tap, a chamfering cutter, and a T-slot cutter and may be applicable to various rotating tools rotationally-driven to perform predetermined machining, such as grinding tools such as grindstone and rolling tools such as a cold forming tap. Although particularly effective when machining is performed under conditions relatively easily generating heat such as air blow, the present invention may be applicable to a machining head replaceable rotating tool assumed to use cooling oil for machining.

A machining head is configured to have a cutting edge etc., depending on a type of tool and is made of a predetermined tool material such as cemented carbide and high-speed tool steel. The machining head can be coated with a compound film such as TiN, TiCN, TiAlN, or CrN and a hard film such as DLC (diamond like carbon) film and diamond film and subjected to steam treatment, nitriding treatment, etc., as needed.

Although a holder is attached to a main shaft etc., and rotationally-driven and is, for example, a shank such as a straight shank or a taper shank, the holder can take various forms and may be automatically attached/detached to/from the main shaft etc., by an automatic tool replacing apparatus. An inexpensive material can be employed for the holder, such as carbon steel with abrasion resistance, hardness, strength, etc., lower than the machining head.

Although a fastening male screw is protruded on the shaft center of the machining head, for example, and is threadably engaged with a fastening female screw disposed in a tip center portion of the holder, the fastening male screw may be protruded on the tip center portion of the holder and threadably engaged with the fastening female screw disposed in the shaft center of the machining head.

The machining head and the holder are desirably disposed with a taper portion and a taper hole in a truncated conical shape brought into close contact with each other to concentrically position the machining head and the holder in a fastened state when the fastening male screw and the fastening female screw are threadably engaged. For example, if the fastening male screw is protruded on the machining head, the taper portion is disposed on the base end side of the fastening male screw with a diameter increasing as the taper portion is separated away from the fastening male screw while the taper hole is disposed closer to the tip than the fastening female screw of the holder with a greater diameter on the tip side such that the inner circumferential surface of the taper hole is brought into close contact with the outer circumferential surface of the taper portion.

The machining head and the holder are disposed with abutting surfaces abutted against each other in a fastened state when the fastening male screw and the fastening female screw are threadably engaged, separately from the taper portion and the taper hole or without disposing the taper portion and the taper hole. The abutting surfaces are flat surfaces substantially perpendicular to the shaft center abutted in the axial direction, flat surfaces substantially perpendicular to the circumferential direction abutted in the circumferential direction, etc., and can take various forms capable of preventing further rotation in the fastening direction.

A flank angle α of a following flank is less than 20°, desirably, equal to or less than 15° since an angle equal to or greater than 20° makes removal after machining unable or difficult, and is greater than 3°, desirably, equal to or greater than 4° since an angle equal to or less than 3° leads to insufficient attachment strength or makes the machining of flanks difficult. Although depending on a degree of the flank angle α of the following flank, a flank angle β of a leading flank is greater than 30°, desirably, equal to or greater than 35° since an angle equal to or less than 30° leads to insufficient attachment strength and a tendency to be broken, and is equal to or less than 60° since a degree greater than 60° makes the height of thread lower and the pitch larger.

Although the third aspect of the present invention relates to a removal aiding pin, the removal aiding pin is not necessarily needed in other implementations of the present invention and it is not necessary to dispose a removal female screw in the holder. Although an engagement projection and an engagement recess in a conical shape fitted in surface contact with each other are respectively disposed on the shaft centers at the abutting locations of the removal aiding pin and the machining head in the third aspect of the present invention, the engagement projection and the engagement recess are not disposed in other implementations of the present invention and, for example, the flat end surfaces perpendicular to the shaft center may be abutted against each other.

Although a male screw disposed on the removal aiding pin and the removal female screw of the holder can be disposed irrespectively of the fastening male screw and the fastening female screw, the screws can be disposed with the same pitch (lead) and, in this case, the machining head can be removed from the holder by integrally holding and rotating the removal aiding pin and the machining head relatively to the holder, for example.

Since the engagement projection and the engagement recess in a conical shape disposed on the abutting locations of the removal aiding pin and the machining head may be capable of centering concentrically when engaged with each other, the engagement projection and the engagement recess may not necessarily have a complete conical shape and may have a truncated conical shape with a flat tip or hole bottom.

To threadably engage the removable aiding pin concentrically with the holder at high accuracy, desirably, a through-hole of the holder is disposed with a positioning hole having a perfectly circular cross section and the removal aiding pin is disposed with a column-shaped positioning fitting portion slidably fitted in contact with the inner circumferential surface of the positioning hole. It is desirable to dispose the positioning hole and the positioning fitting portion in the vicinity of a portion where the engagement projection and the engagement recess in a conical shape are fitted.

Desirably, the holder, the machining head, and the removal aiding pin are disposed with a tool locking portion capable of locking the tool in a relatively rotatable manner so as to lock and non-rotatably fix the tool and to rotate the tool around the shaft center. The tool locking portion is a pair of flat surfaces disposed in parallel with each other at symmetric positions sandwiching the shaft center, a head portion having an outer circumferential shape of a polygon such as hexagon or quadrangle or an oval, or a locking hole in a shape of polygon such as hexagon or quadrangle or an oval disposed in an end surface in the axial direction.

Embodiment

An embodiment of the present invention will now be described in detail with reference to the drawings.

FIG. 1 is a diagram of a machining head replaceable rotating tool 10 according to one embodiment of the present invention; (a) is a front view in the direction perpendicular to a shaft center O; (b) is a bottom view from the tip side; (c) is a cross section taken along IC-IC of (a); and (d) is a perspective view. This machining head replaceable rotating tool 10 is a milling tool and includes a column-shaped straight shank 12 and a machining head 14. The shank 12 corresponds to a holder and is made of relatively inexpensive high-speed tool steel while the machining head 14 is made of cemented carbide and is disposed with six peripheral cutting edges 16 and coated with a hard film such as a compound film as needed. A cutting edge diameter D of the peripheral cutting edges 16 is 12 mm in this embodiment and is the same dimension as the diameter dimension of the shank 12.

Figure 2B:
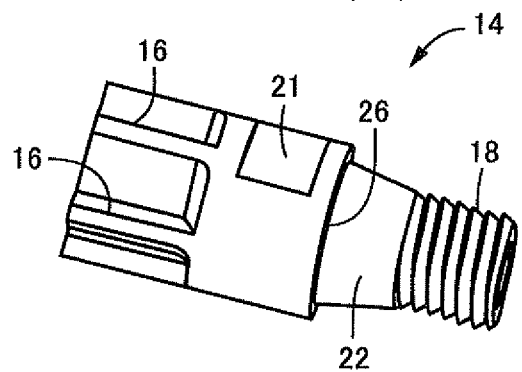

FIG. 2 is a diagram for explaining the machining head 14; (a) is a cross-sectional view including a shaft center S1; (b) is a perspective view; and (c) is an enlarged view of a cross section of a fastening male screw 18 disposed on the machining head 14. FIG. 3 is a diagram for explaining the shank 12; (a) is a cross-sectional view including the shaft center O; and (b) is a perspective view of a cross section including the shaft center O. The machining head 14 has the fastening male screw 18 protruded concentrically with the shaft center S1 on the end surface opposite to the tip side disposed with the peripheral cutting edges 16 while a tip center portion of the shank 12 is disposed with a fastening female screw 20 to be threadably engaged with the fastening male screw 18 concentrically with the shaft center O, and the machining head 14 is concentrically and removably attached to the tip portion of the shank 12 by threadably engaging the fastening male screw 18 with the fastening female screw 20. The machining head 14 is disposed with a pair of flat locking surfaces 21 in a double-chamfered shape in parallel with each other at symmetric positions relative to the shaft center S1 as tool locking portions that lock the tool so as to threadably engage the fastening male screw 18 with the fastening female screw 20.

The machining head 14 and the shank 12 are disposed with a taper portion 22 and a taper hole 24 in a truncated conical shape concentrically with the shaft centers S1 and O, respectively, in close contact with each other so as to concentrically position the machining head 14 and the shank 12 in a fastened state when the fastening male screw 18 and the fastening female screw 20 are threadably engaged. The taper portion 22 is disposed on the base end side of the fastening male screw 18 with a diameter increasing as the taper portion 22 is separated away from the fastening male screw 18; the taper hole 24 is disposed closer to the tip than the fastening female screw 20 of the shank 12 with a greater diameter on the tip side; and the inner circumferential surface of the taper hole 24 is brought into close contact with the outer circumferential surface of the taper portion 22 to integrally attach the machining head 14 to the shank 12 in a concentrically positioned manner. A taper angle θ (see FIG. 1(c)) of the taper portion 22 and the taper hole 24 is about 20° in this embodiment.

The machining head 14 and the shank 12 are disposed with abutting surfaces 26, 28 abutted against each other in the fastened state when the fastening male screw 18 and the fastening female screw 20 are threadably engaged, separately from the taper portion 22 and the taper hole 24. The abutting surface 26 is an annular-shaped flat surface substantially perpendicular to the shaft center S1 continuously disposed on the end on the greater diameter side of the taper portion 22; the abutting surface 28 is an annular-shaped flat surface substantially perpendicular to the shaft center O continuously disposed on the greater diameter side of the taper hole 24, i.e., the front end surface of the shank 12; and the abutting surfaces 26, 28 are abutted against each other in the axial direction so as to prevent the further rotation of the fastening male screw 18 and the fastening female screw 20 in the fastening direction.

This machining head replaceable rotating tool 10 is integrally and rotationally driven via the shank 12 held by a main shaft etc., in a tool rotation direction causing the fastening male screw 18 and the fastening female screw 20 to be fastened by a machining load to perform the milling with the machining head 14. In this embodiment, the fastening male screw 18 and the fastening female screw 20 are right-hand screws and the tool rotation direction is a clockwise direction when viewed from the shank 12. Since the fastening male screw 18 and the fastening female screw 20 are fastened by the machining load, a risk of loosening of the fastened state due to the machining load is eliminated while the abutment between the abutting surfaces 26 and 28 prevents the fastening male screw 18 and the fastening female screw 20 from being further fastened by the machining load and the machining head 14 is prevented from being unable to be removed due to excessive tightening.

Figure 3A:
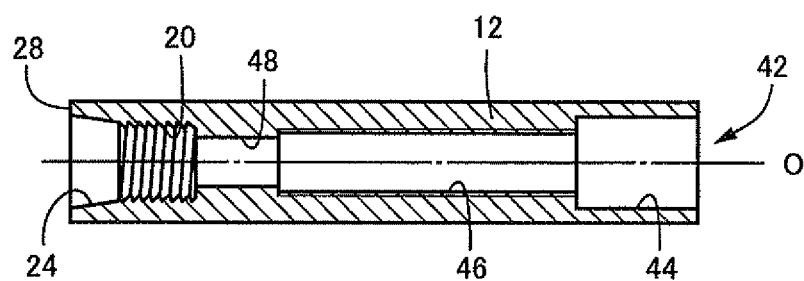
FIG. 3 is a diagram for explaining the holder in the embodiment of FIG. 1; (a) is a cross-sectional view including the shaft center O; and (b) is a perspective view of a cross section including the shaft center O.
Figure 4A:
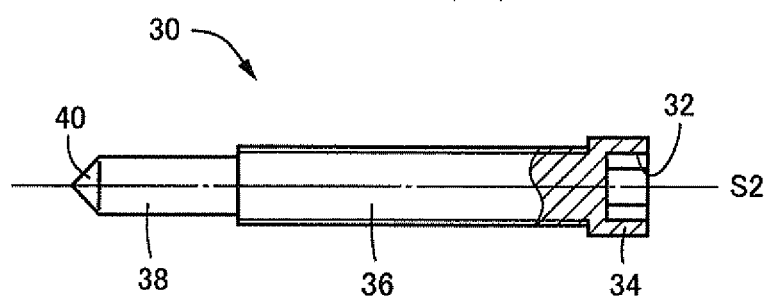
FIG. 4 is a diagram of the removal aiding pin which is used when the machining head is removed from the holder in the machining head replaceable rotating tool of FIG. 1; (a) is a partially cut-out front view; (b) is a perspective view.
Figure 4B:
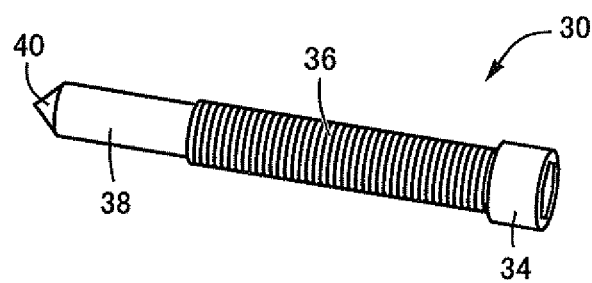

In this embodiment, a removal aiding pin 30 is prepared that is used when the machining head 14 is removed from the shank 12. FIG. 4 is a diagram of the removal aiding pin 30; (a) is a partially cut-out front view in the direction perpendicular to a shaft center S2; (b) is a perspective view; and the removal aiding pin 30 includes a head portion 34 disposed with a hexagonal socket 32 as a tool locking portion, a male screw portion 36, a column-shaped positioning fitting portion 38 with a diameter smaller than the male screw portion 36, and a conical-shaped engagement projection 40 disposed on a tip of the positioning fitting portion 38, in this order integrally on the shaft center S2. On the other hand, the shank 12 is disposed with a through-hole 42 penetrating the shaft center O, has the fastening female screw 20 and the taper hole 24 formed in the tip portion, and is disposed with a large diameter hole 44 capable of receiving the head portion 34 from the other end portion, i.e., the back end portion on the right side of FIG. 3(a), a removal female screw 46 threadably engaged with the male screw portion 36, and a positioning hole 48 having a perfectly circular cross section slidably fitted with the positioning fitting portion 38, and the positioning hole 48 is adjacent to the fastening female screw 20 in the axial direction.

Figure 5A:
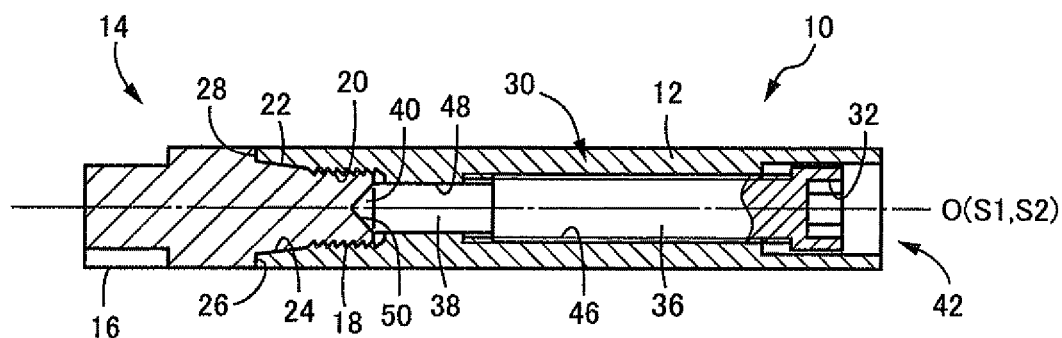
FIG. 5 is a diagram of the state where the machining head is removed from the holder by using the removal aiding pin of FIG. 4 in the machining head replaceable rotating tool of FIG. 1; (a) is a cross-sectional view including the shaft centers O, S1, and S2; and (b) is a cut-out perpendicular view of the holder.
Figure 5B:
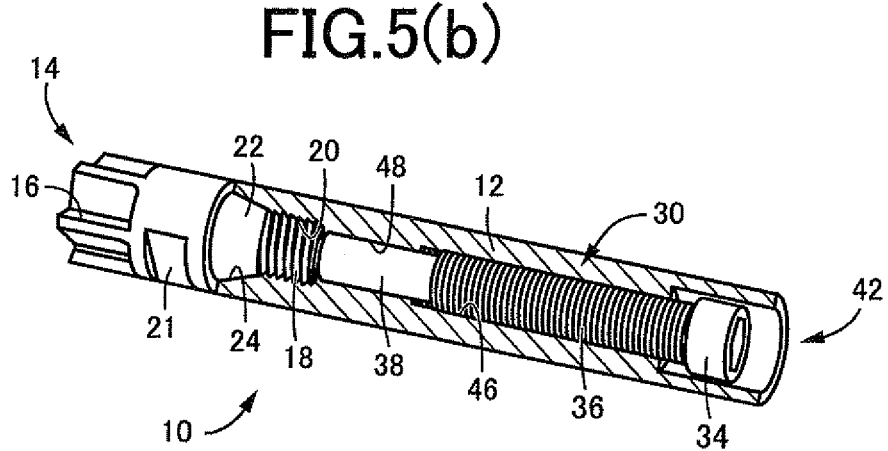

As depicted in FIG. 5, the removal aiding pin 30 is inserted into a back-end opening of the through-hole 42 from the engagement projection 40 with the male screw portion 36 threadably engaged with the removal female screw 46 and the engagement projection 40 abutted against the machining head 14 so as to apply a pressing force to push out the machining head 14 in the axial direction when the threadable engagement between the fastening male screw 18 and the fastening female screw 20 is loosened to remove the machining head 14 from the shank 12. A tip surface of the fastening male screw 18 of the machining head 14, i.e., an abutting location abutted against the engagement projection 40 is disposed with a conical-shaped engagement recess 50 concentrically with the shaft center S1 with the same taper angle as the engagement projection 40 (about 90° in this embodiment) and, the machining head 14 and the removal aiding pin 30 as well as the shank 12 are concentrically centered by fitting the engagement projection 40 and the engagement recess 50 into surface contact, allowing the threadable engagement between the fastening male screw 18 and the fastening female screw 20 to be loosened relatively easily. The tip of the engagement projection 40 is cut off or a clearance hole is disposed in the bottom portion of the engagement recess 50 so as to allow the outer circumferential surfaces (taper surfaces) of the engagement projection 40 and the engagement recess 50 to be certainly brought into surface contact. FIG. 5 is a diagram of the removal aiding pin 30 threadably engaged with the removal female screw 46 of the shank 12 and the engagement projection 40 abutted against the engagement recess 50; (a) is a cross-sectional view including the shaft centers O, S1, and S2; and (b) is a cut-out perpendicular view of the shank 12.

Figure 2C:
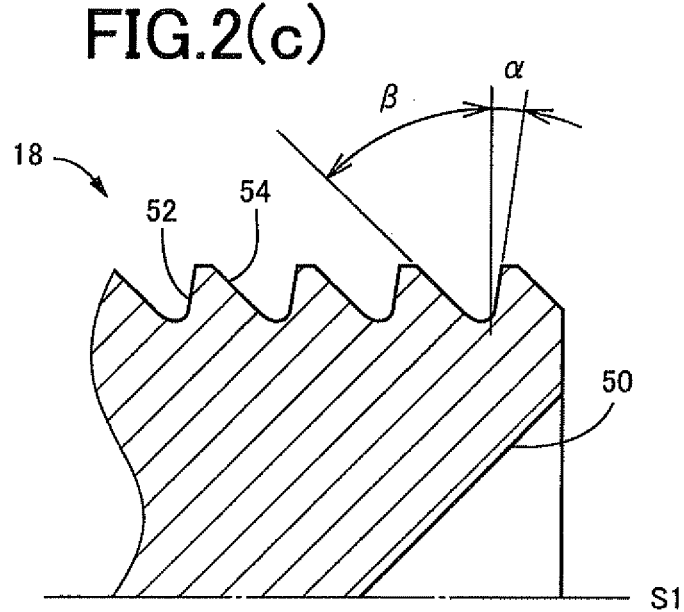
Figure 3B:
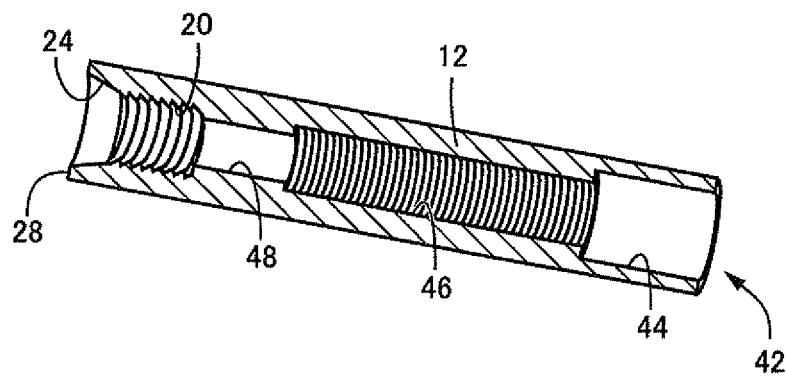

As depicted in the enlarged cross section of the fastening male screw 18 of FIG. 2(c), the fastening male screw 18 and the fastening female screw 20 are made up of saw-tooth buttress screws having a flank angle α of a following flank 52 smaller than a flank angle β of a leading flank 54. In this embodiment, the flank angle α of the following flank 52 is within a range of 4° to 15° and the flank angle β of the leading flank 54 is within a range of 35° to 60°. Although the thread of the fastening female screw 20 is configured in the same way, the shape thereof corresponds to the thread of the fastening male screw 18 of FIG. 2(c) and will not depicted.

In the machining head replaceable rotating tool 10, since the fastening male screw 18 and the fastening female screw 20 are made up of saw-tooth buttress screws having the flank angle α of the following flank 52 smaller than the flank angle β of the leading flank 54, if the thermal expansion occurs when milling is performed by the machining head 14, the following flanks 52 are unlikely to firmly and closely contact with and adhere to each other and the adherence of the leading flanks 54 on the opposite side is also suppressed, thereby facilitating a removal operation when the machining head 14 is replaced. In this case, since the flank angle β of the leading flank 54 is relatively large, predetermined attachment strength can be maintained.

Since the flank angle α of the following flank 52 is within a range of 4° to 15° and the flank angle β of the leading flank 54 is within a range of 35° to 60°, the machining head 14 can easily be removed and replaced while maintaining predetermined attachment strength as apparent from a test result of FIG. 6.

When the threadable engagement between the fastening male screw 18 and the fastening female screw 20 is loosened to remove the machining head 14 from the shank 12, the removal aiding pin 30 can be inserted into the through-hole 42, threadably engaged with the removal female screw 46, and abutted against the machining head 14 to apply a force in the direction of pushing out the machining head 14, thereby further facilitating the removal of the machining head 14. Particularly, since the abutting locations of the removal aiding pin 30 and the machining head 14 are disposed with the engagement projection 40 and the engagement recess 50 in a conical shape fitted and brought into surface contact with each other concentrically with the shaft centers S2 and S1, respectively, the machining head 14 and the removal aiding pin 30 as well as the shank 12 are concentrically centered by the engagement of the engagement projection 40 and the engagement recess 50, allowing the threadable engagement between the fastening male screw 18 and the fastening female screw 20 to be loosened more easily. In this embodiment, since the positioning hole 48 disposed adjacently to the fastening female screw 20 is fitted with the positioning fitting portion 38 of the removal aiding pin 30 and the removal aiding pin 30 is concentrically centered with the shank 12 in the vicinity of the fitting portion of the engagement projection 40 and the engagement recess 50, the fastening female screw 20 of the shank 12 and the fastening male screw 18 of the machining head 14 can concentrically be centered via the removal aiding pin 30 at high accuracy.

FIG. 6 is a diagram for explaining a result when ten types of test samples Nos. 1 to 10 of the fastening male screw 18 and the fastening female screw 20 having different flank angles α, β are prepared to check the acceptance/rejection of the machining and the removability of the machining head 14 after the machining in the machining head replaceable rotating tool 10; (a) is a diagram of cutting test conditions; and (b) is a diagram of a test result. In a judgment column of FIG. 6(b), "○", "Δ", and "x" denote comprehensive determination of the acceptance/rejection of the machining and the removability of the machining head 14 described in a remarks column; "○" denotes the case that the machining and the removability are both satisfactory; "Δ" denotes the case that the machining and the removability are both satisfactory while at least one is insufficient; and "x" denotes the case that at least one of the machining and the removability is unsatisfactory (does not satisfy a predetermined requirement).

As apparent from the result of FIG. 6, with the test samples Nos. 7 to 9 having the flank angle α of the following flank 52 within a range of 4° to 15° and the flank angle β of the leading flank 54 within a range of 35° to 60°, excellent attachment strength can be acquired without generating chatter vibrations etc., or being broken and the machining head 14 can easily be removed by using the removal aiding pin 30 when the machining head 14 is removed after the machining. On the other hand, with the test sample No. 6 having α=20° and β=45°, although the machining can properly be performed without generating chatter vibrations etc., the operation of removing the machining head 14 after the machining is difficult and, therefore, the flank angle α of the following flank 52 is desirably set to less than 20°. With the test sample No. 10 having α=3° and β=45°, although the machining head 14 can easily be removed after the machining, chatter vibrations are generated during the machining. Therefore, a certain angle is necessary in terms of attachment strength for the flank angle α of the following flank 52 and is desirably greater than 3°. Other test samples Nos. 1 to 5 cannot properly be used in the machining conditions because sufficient attachment strength cannot be acquired and the tool is broken at the coupling portion (screw coupling portion) during the machining or the machining head 14 is unable to be removed after the machining.

Although the embodiment of the present invention has been described in detail with reference to the drawings, the embodiment is merely one embodiment and the present invention may be implemented in variously modified or altered forms based on the knowledge of those skilled in the art.

DESCRIPTION OF REFERENCE NUMERALS

10: machining head replaceable rotating tool 12: shank (holder) 14: machining head 18: fastening male screw 20: fastening female screw 26, 28: abutting surfaces 30: removal aiding pin 40: engagement projection 42: through-hole 46: removal female screw 50: engagement recess 52: following flank 54: leading flank O: shaft center of a holder S1: shaft center of a machining head S2: shaft center of a removal aiding pin

The invention claimed is:

1. A machining head replaceable rotating tool having a fastening male screw and a fastening female screw disposed on respective shaft centers of one and the other of a machining head and a holder, the fastening male screw and the fastening female screw being threadably engaged with each other to concentrically and removably attach the machining head to a tip portion of the holder,
the machining head and the holder being disposed with abutting surfaces abutted against each other in a fastened state when the fastening male screw and the fastening female screw are threadably engaged,
the machining head replaceable rotating tool being integrally and rotationally driven via the holder in a tool rotation direction causing the fastening male screw and the fastening female screw to be fastened by a machining load to perform predetermined machining with the machining head, the abutment of the abutting surfaces preventing the fastening male screw and the fastening female screw from being further fastened by a machining load,
the fastening male screw and the fastening female screw being made up of saw-tooth buttress screws having a flank angle α of a following flank smaller than a flank angle β of a leading flank,
the holder being disposed with a through-hole penetrating a shaft center, wherein at least a portion of the through-hole is disposed with a removal female screw,
the machining head replaceable rotating tool having a removal aiding pin inserted into the through-hole from a back end of the holder and threadably engaged with the removal female screw with a tip portion abutted against the machining head to press and push out the machining head when the threadable engagement between the fastening male screw and the fastening female screw is loosened to remove the machining head from the holder,
an engagement projection and an engagement recess in a conical shape fitted in surface contact with each other being respectively disposed on shaft centers at abutting locations of the removal aiding pin and the machining head, and
the through-hole being disposed with a positioning hole having a circular cross section at a portion adjacent to the fastening female screw, and the removal aiding pin being disposed with a column-shaped positioning fitting portion slidably fitted with the positioning hole, and
the through-hole being disposed with a larger diameter hole than a major diameter of the fastening female screw on the back end of the holder, wherein the larger diameter hole receives a head portion disposed on a back end of the removal aiding pin, wherein the head portion is a largest diameter portion of the removal aiding pin.

2. The machining head replaceable rotating tool of claim 1, wherein
the flank angle α of the following flank is within a range of 4° to 15° and the flank angle β of the leading flank is within a range of 35° to 60°.

3. A holder of the machining head replaceable rotating tool of claim 1.

4. A holder of the machining head replaceable rotating tool of claim 2.

5. A machining head of the machining head replaceable rotating tool of claim 1.

6. A machining head of the machining head replaceable rotating tool of claim 2.

* * * * *